(12) United States Patent
Miller et al.

(10) Patent No.: US 8,600,906 B2
(45) Date of Patent: Dec. 3, 2013

(54) SYSTEMS AND METHODS FOR CLASSIFYING GOODS FOR EXPORT

(75) Inventors: Marshall V. Miller, Kansas City, MO (US); Sean T. Murray, Kansas City, MO (US); Charles W. Ballard, Kansas City, MO (US)

(73) Assignee: ECCNSelect, LLC, Kansas City, MO (US)

( * ) Notice: Subject to any disclaimer, the term of this patent is extended or adjusted under 35 U.S.C. 154(b) by 88 days.

(21) Appl. No.: 13/098,223

(22) Filed: Apr. 29, 2011

(65) Prior Publication Data

US 2012/0278250 A1    Nov. 1, 2012

(51) Int. Cl.
*G06Q 30/00* (2012.01)
(52) U.S. Cl.
USPC ......................................................... 705/331
(58) Field of Classification Search
USPC ......................................................... 705/331
See application file for complete search history.

(56) References Cited

U.S. PATENT DOCUMENTS

| | | | |
|---|---|---|---|
| 2004/0243516 A1* | 12/2004 | Zinssmeister et al. | 705/59 |
| 2006/0036504 A1* | 2/2006 | Allocca et al. | 705/26 |
| 2008/0114643 A1* | 5/2008 | Milovina-Meyer et al. | 705/14 |
| 2008/0294536 A1* | 11/2008 | Taylor et al. | 705/28 |
| 2011/0218928 A1* | 9/2011 | Refior et al. | 705/310 |

* cited by examiner

*Primary Examiner* — Allen J Jung
(74) *Attorney, Agent, or Firm* — Lewis, Rice & Fingersh, L.C.

(57) ABSTRACT

This disclosure relates to systems and methods of classifying exports. These systems and methods are generally computer implemented methodologies, or software for implementing such methodologies on a computer or computer network, that serve to make it easier to determine the classification of an export and to generate a report associated with that classification. Through a series of user inputs of information about the export entered at the user's own personal computer, the classification software installed on the remote auxiliary computer generates a classification report associated with the export and transmits the report to the personal computer via the Internet.

11 Claims, 10 Drawing Sheets

EAR Classification Checklist ("ExChecker")

| | Category 7: Navigation and Avionics | |
|---|---|---|
| | This item has been classified. | |
| Form No | Name | ECCN |
| 62 | Cat 7 Classification 20090618 | 7A002.c.1 |

| | |
|---|---|
| Full Description and Use of Item | Cat 7 Classification 20090618 |
| Model No / Part No | Cat 7 Classification 20090618 |

| Destination Details | |
|---|---|
| Name | Jon Doe |
| Title | Employee |
| Company | Company, Inc. |
| Address | 1234 Main St. Anywhere USA 12345 |
| Phone | 111-222-3333 |
| Email | Employee@company.com |

| Completed By | |
|---|---|
| Name | Jon Doe |
| Title | Employee |
| Company | Company, Inc. |
| Address | 1234 Main St. Anywhere USA 12345 |
| Phone | 111-222-3333 |
| Email | Employee@company.com |

Fig. 3

EAR Classification Checklist ("ExChecker") ⌐302
Category 7: Navigation and Avionics

| Question No. | Question Text | Answer | |
|---|---|---|---|
| 0.1 | Is the item a _piece_ of equipment, a system, or a component thereof? | Yes | 410 |
| 1.0 | Is the item an accelerometer or specially designed components therefor, other than those specially designed and developed as Measurement While Drilling (MWD) sensors for use in downhole well service applications? | No | 411 |
| 2.0 | Is the item a gyro or angular rate sensor or specially designed components therefor? | Yes | 412 |
| 2.1 | Does it have bias stability, when measured in a 1 g environment over a period of one month, and with respect to a fixed calibration value, of less (better) than 0.5 degree per hour when specified to function at linear acceleration levels up to and including 100 g? | No | 413 |
| 2.2 | Does it have an angle random walk of less (better) than or equal to 0.0035 degree per square root hour, other than spinning mass gyros (spinning mass gyros which use a continually rotating mass to sense angular motion)? | No | 414 |
| 2.3 | Does it have a rate range greater than or equal to 500 degrees per second? | Yes | 415 |
| 2.3.1 | Does it have a bias stability, when measured in a 1 g environment over a period of three minutes, and with respect to a fixed calibration value of less(better) than 40 degrees per hour? | Yes | 416 |

ATTORNEYS AT LAW

Creating a New Classification

☑ Sho Full Explanations of Categories

601 ○ Category 0: Nuclear Materials, Facilities and Equipment and Miscellaneous [Including Non-Nuclear-Related Items]
Items specially designed for use with nuclear reactors and other non-military nuclear applications, and "miscellaneous" items as military equipment (military construction equipment, helmets, bayonets, searchlights), police equipment (handcuffs, helmets, shields, batons, straight jackets), stun guns and electric prods, shotguns and shotgun shells, gun optics, torture device, and "horses by sea."

○ Category 1: Materials, Chemicals, Microorganisms, and Toxins
Fluorinated compounds, composites, laminates, fibers, filaments, or polymers, and items made from these materials; chemical/biological protective equipment (gas masks, detectors, decontamination equipment, suits, etc.); body armor, bomb squad equipment, explosives, propellants, and related items (detonators, etc.); anti-detection devices; catalysts and other items for water applications; radiation shielding windows; depleted uranium and x-ray/radiographic items; tear gas, pepper spray, smoke bombs and similar items; production, testing, and inspection equipment for various materials; pumps and valves; chemical, toxins, biological and genetic agents, pathogens; metals, alloys, other materials; fluids; ceramics; gases; petroleum and related substances; Western red cedar; vaccines, immunotoxins, diagnostic, food testing, arid and other medical devices.

○ Category 2: Materials Processing
Bearings; crucibles, valves, pumps, pipes, and other material handling items; generators; nuclear handling/processing equipment; explosive detection equipment; machine tools; presses; overlay and chemical vapor deposition equipment; measuring, testing, and inspection equipment; robots; spin- and flow-forming equipment; balancing equipment; motion simulators; centrifuges; furnaces; gas, coil, and electromagnetic guns; chemical manufacturing equipment; gas monitoring and detection equipment; biological handling equipment; welders; mining, drilling and earth-moving equipment.

○ Category 3: Electronics

SYSTEMS AND METHODS FOR CLASSIFYING GOODS FOR EXPORT

BACKGROUND

1. Field of the Invention

This disclosure relates to the field of systems and methods for computer systems for the classification of goods. Specifically, the disclosure relates to computer systems for classifying goods for U.S. export control purposes.

2. Description of Related Art

The United States and most other countries place restrictions on the types of goods that businesses which reside within those countries are allowed to export and import. While many goods and services flow freely between countries and over national borders, certain types of materials present concerns for governments should they be provided to a foreign entity. These are generally termed "controlled goods," and the failure to comply with the restrictions carries with it stiff penalties and the denial of export privileges.

The most obvious of these controlled goods is military hardware and related equipment. While a number of defense contractors make and sell products both to the United States military and to foreign militaries, the United States government has an undeniable interest in trying to prevent the most valuable military items from being obtained by a hostile foreign government, a terrorist organization, or another entity whose interest in obtaining such military hardware is to use it against the United States or its allies. Thus, there exists stringent exporting laws and licensing requirements for such type of goods and destinations.

While military hardware is an obvious example of an area where export controls exist, it is not the only one. Certain items, for example some precision scientific instruments, aerospace technology, electronics, pharmaceuticals, and computer technology, while not military devices per se, can also be used by a foreign government to create certain types of military hardware that the United States would prefer them not to have. The export of such items can also be controlled by the United States government. However, many of these are purely exported as commercial items without an obvious or intended military use. The export of such items, termed "dual-use," can also be controlled by the United States government and are subject to the export regulations discussed below.

As much as the United States government has an interest in preventing potentially dangerous entities form obtaining certain items, there is also the practical reality that in many instances the sale of such items is necessary to further the Untied States' interest. For example, the sale of military hardware to strong allies is generally necessary to allow the Untied States military to coordinate with them and in some situations, to allow for the militaries to use the same hardware to improve both their actions. Further, items such as scientific instruments often have legitimate and necessary uses by certain foreign governments. Finally, many of these dual-use items are exported for purely commercial and non-military reasons.

The dual government interests in promoting most exports and regulating certain exports has therefore led to the shaping of the United States exports laws and regulations. As is often the case in legal writing, these regulations are a patchwork of different rules, regulations, and laws that have come into being at different times and for different reasons and are continuously being updated and altered. The regulations that govern export activity include, but are not limited to, the Export Administration Regulations ("EAR"), the International Traffic in Arms Regulations ("ITAR"), the Trading with the Enemy Act, the Customs Modernization Act, the Bureau of Alcohol Tobacco and Firearms Regulations, and the Atomic Energy Act (the entire disclosure of these regulations is incorporated herein by reference). As a result of the voluminous rules and regulations, keeping track of the countless export regulatory requirements can be a daunting task. This is particularly true with the two regulations that govern most export activity: the EAR and the ITAR.

Most exported goods, particularly civilian goods, are regulated under the EAR, which is administered by the U.S. Department of Commerce Bureau of Industry and Security ("BIS"). These are generally non-military, commercial, and/or dual-use goods, and many of these goods have specific licensing requirements and export restrictions. These goods are listed on the Commerce Control List ("CCL").

A key to determining the level of export control for a particular export is determining the specific Export Control Classification Number ("ECCN"), and an exporter is obligated to correctly classify the export's ECCN to determine the associated controls. Doing so, however, is time consuming and difficult as it requires navigation through the comprehensive libraries of regulations document associated with the ECCNs. In fact, determining the correct ECCN for a particular export oftentimes requires the advice of an expert in the field of international trade—a costly endeavor. Additionally, for novice and experienced exporters alike, there is exists a significant risk and concern over mischaracterizing certain exports, particularly in regards to non-military and dual-use goods.

Additionally, although an export may appear to be a civilian item regulated under the EAR, this is not always the case. An exporter may spend a significant and needless amount of time trying to determine the ECCN classification of an export only to later learn that the export is actually regulated under the ITAR. The ITAR is administered by the U.S. Department of State, Directorate of Defense Trade Control ("DDTC"), who is charged with controlling the export of defense articles and defense services covered by the United States Munitions List ("USML"). The USML is based on an entirely different set of rules and regulations than the ECCN and is equally daunting.

Taking these difficulties together, what is needed is a system and method for quickly and efficiently determining and documenting the classification of an export under the EAR.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein is a system and method of classifying exports. These systems and methods are generally computer implemented methodologies, or software for implementing such methodologies on a computer or computer network, that serve to make it easier to determine the classification of an export and to generate a report associated with that classification. Through a series of user inputs of information about the export entered at the user's own personal computer, the classification software installed on the remote auxiliary computer generates a classification report associated with the export and transmits the report to the personal computer via the Internet. This report could include, for example, any licensing requirements and any restrictions or prohibitions that are associated with a particular export and any penalties and denial of export privileges for non-compliance.

These systems and methods beneficially allow an exporter to generate a classification report anywhere that internet is available. Such a report could be useful, for example, should a government agency ever investigate an exporter to determine compliance with the applicable regulations. Additionally, this process saves an exporter the cost associated with seeking the advice of an expert and from the time needed to navigate the voluminous and countless export regulatory rules and requirements.

There is described herein, among other things, a system for classifying exports. In a first embodiment of the invention, the system is comprised of: a first computer including classification software running thereon; and a second computer located at a location remote from the first computer and connected to the first computer by a network. The second computer obtains export information and accesses the classification software via the network. Additionally, the classification software generates a request for initial export information and receives responses to the request for initial export information. Then, the classification software generates at least one request for additional export information based on the response to the requests for initial export information. Finally, in this embodiment, the classification software generates a classification report based on the response to the requests for additional export information.

In a further embodiment of the invention, the classification report of the system comprises an ECCN classification. In yet another embodiment, the initial request for export information comprises a CCL category.

In another embodiment of the invention, the request for additional export information of the system are based on export regulations. In a further embodiment, the request for additional export information comprises a series of prearranged questions. In still another embodiment, the prearranged questions comprise polar questions. In yet another embodiment, the response to the requests for additional export information is limited to yes or no.

In another embodiment of the invention, the request for additional export information of the system comprises at least one polar question. In yet another embodiment of the invention, the network comprises the Internet.

In another embodiment, the first computer is a server. In yet another embodiment, the classification software causes the classification report to be saved on the second computer. In still another embodiment, the classification software causes the classification report to be saved on the first computer.

In yet another embodiment of the invention there exists a method for classifying exports. In this embodiment, the method is comprised of: providing a first computer including classification software running thereon; and providing a second computer located at a location remote from the first computer and connected to the first computer by a network. In an embodiment, the second computer obtains export information and accesses the classification software via the network. Additionally, the classification software generates a request for initial export information comprised of CCL categories and receives responses to these request for initial export information. The classification software then generates at least one request for additional export information based on the responses to the requests for initial export information. These requests for additional export information are comprised of polar questions. Finally, in an embodiment, the classification software generates a classification report based on the responses to the requests for initial export information and the requests for additional export information.

DESCRIPTION OF THE PREFERRED EMBODIMENT(S)

The system and methods disclosed herein are principally designed for providing specific classification and regulations to an exporter. Generally, an exporter accesses classifying software installed on a remote auxiliary computer via the Internet. Through a series of user inputs of information about the export entered at his/her own personal computer, the classification software installed on the remote auxiliary computer generates a classification report associated with the export and transmits the report to the personal computer via the Internet. This classification report is generally geared specifically to the particular good or item to be exported and is generally very useful in ensuring compliance with the export controls associated with the export. The classification report associated with a particular export is generated within the system, as detailed more fully below, and is based on the information supplied by the exporter to the system.

An "exporter" as discussed herein will generally refer to an individual, a company, or a representative of a company who has, or will be, sending (by plane, train, boat, truck, automobile, electronic transmission, or any other mode of commerce) any good, item or information (the "export") from one country to another country. Additionally, however, the exporter may not actually send or have sent the export, and instead, the exporter may merely be interested in sending the export or may be acting on behalf of another who intends to send the export. While the current disclosure only discusses exporters, one of ordinary skill in the art would readily appreciate that the current system would have equal applicability to a system for classifying imports. As such, exporters are merely used as an example. In other embodiments, the system could also generate detailed classification reports for imports and/or importers.

The "export" includes, but is not limited to, any good, item, technology, pharmaceutical, equipment, software, or information that has been, will be, or currently is being sent, mailed, or otherwise transmitted, from one country to another country. While the current disclosure only discusses exports, one of ordinary skill in the art would readily appreciate that the current system would have equal applicability to a system for classifying imports and reexports. As such, exports are merely used as an example and the term is meant to also include imports and reexports.

The "classification report," as used herein, is the report generated by the system of the current disclosure, and generally will comprise a type of government classification, or any other classification, of the export, including, but not limited to, those regulated by the Export Administration Regulations ("EAR"), the International Traffic in Arms Regulations ("ITAR"), the Trading with the Enemy Act, the Customs Modernization Act, the Bureau of Alcohol Tobacco and Firearms Regulations, and the Atomic Energy Act (jointly referred to herein as the "regulations" or "export regulations," the entire disclosure of which is incorporated herein by reference). Generally, in most instances, the export will be regulated by the EAR, and this report will thus comprise the Export Control Classification Number ("ECCN") associated with the export. However, in other instances, the export may not actually be governed by the Bureau of Industry and Security ("BIS"), and thus will not have an associated ECCN. While the regulations cited above are only United States regulations, one of ordinary skill in the art would readily recognize that the system of the current disclosure would be equally applicable to foreign country's export regulations and classification systems. Finally, the classification may not be a government regulation or classification at all, and instead may comprise any classification available for goods and exports. In this regard, the classification is in no way limited to classifications related to possible military applications and could include, for example, classifications for exports of foods, pharmaceuticals, and the like.

The classification report is in no way limiting, and may also include any other information relevant to the classification and regulation of exports, including, but not limited to, any or all of the following: name of the report, a detailed analysis of how the classification was determined, any regulations associated with the export, the model and part number of the export, the use of the export, the contact information for the exporter and/or manufacturer, and the destination details.

As noted above, in most instances, the exports will be classified with an ECCN classification. An ECCN is an five character alpha-numeric classification listed in the Commerce Control List ("CCL," part of the EAR, the entire disclosure of which is incorporated herein by reference) and used to identify items for export control purposes. The CCL is divided into ten broad categories that are further subdivided into five product groups, with first number of the five-character ECCN identifying the category to which the export belongs and the second letter identifying the product group, for example 1A001, 4B994, or 8D001. The ten categories of the CCL, broken down into eleven options, are: 0—Nuclear Materials, Facilities & Equipment (and Miscellaneous Items); 1—Materials, Chemicals, Microorganisms, and Toxins; 2—Materials Processing; 3—Electronics; 4—Computers; 5 (Part 1)—Telecommunications; 5 (Part 2)—Information Security; 6—Sensors and Lasers; 7—Navigation and Avionics; 8—Marine; and 9—Propulsion Systems, Space Vehicles and Related Equipment. The five product groups of the CCL are: A—Systems, Equipment and Components; B—Test, Inspection and Production Equipment; C—Material; D—Software; and E—Technology. Additionally, an export may not have an assigned ECCN, in which case it is designated EAR99 (assuming it is not controlled by another agency, for example, a munitions item controlled by the State Department). The export, however, may also, or instead, be classified for other non-military reasons, including classification associated with other regulations of goods, including, for example, food and pharmaceuticals.

Based on the applicable classification (including, but not limited to, ECCN, EAR99, or USML), there exists associated export controls. These controls depend not only on the applicable classification, but also the "reason for control" (as would be understood by one of ordinary skill in the art), the country of destination, the exporter (e.g., denied persons, sanctioned entities or prohibited end-users), the end-use of the export, and any applicable exceptions. The term "controls," as discussed herein, includes, but is not limited to, any licensing requirements and any restrictions or prohibitions that are associated with a particular export and any penalties and denial of export privileges for non-compliance. Again, these controls are in no way limited to military applications and could include any controls associated with exports, including, but not limited to, food controls, pharmaceutical controls, intellectual property controls, and the like.

The term "export information," as discussed herein and described more fully below as it relates to the system, will generally be any information or characteristics (or lack thereof) about an export and that describes the export that the system then uses to generate the classification report. Generally, the exporter will enter this export information into a personal computer which communicates with the classifying software on an auxiliary computer via the Internet. In an embodiment, the initial entered export information will be one of the ten CCL categories chosen by the exporter followed by "yes" or "no" answers to a series of requests (polar questions) by the classifying software, the requests being based on the applicable regulations. The particular request generated is determined by the CCL category and/or the response to previous requests. In this way, the requests and responses generally operate according to a decision tree—an interview process in which the questions are based on the responses to previous questions.

Figure 1:
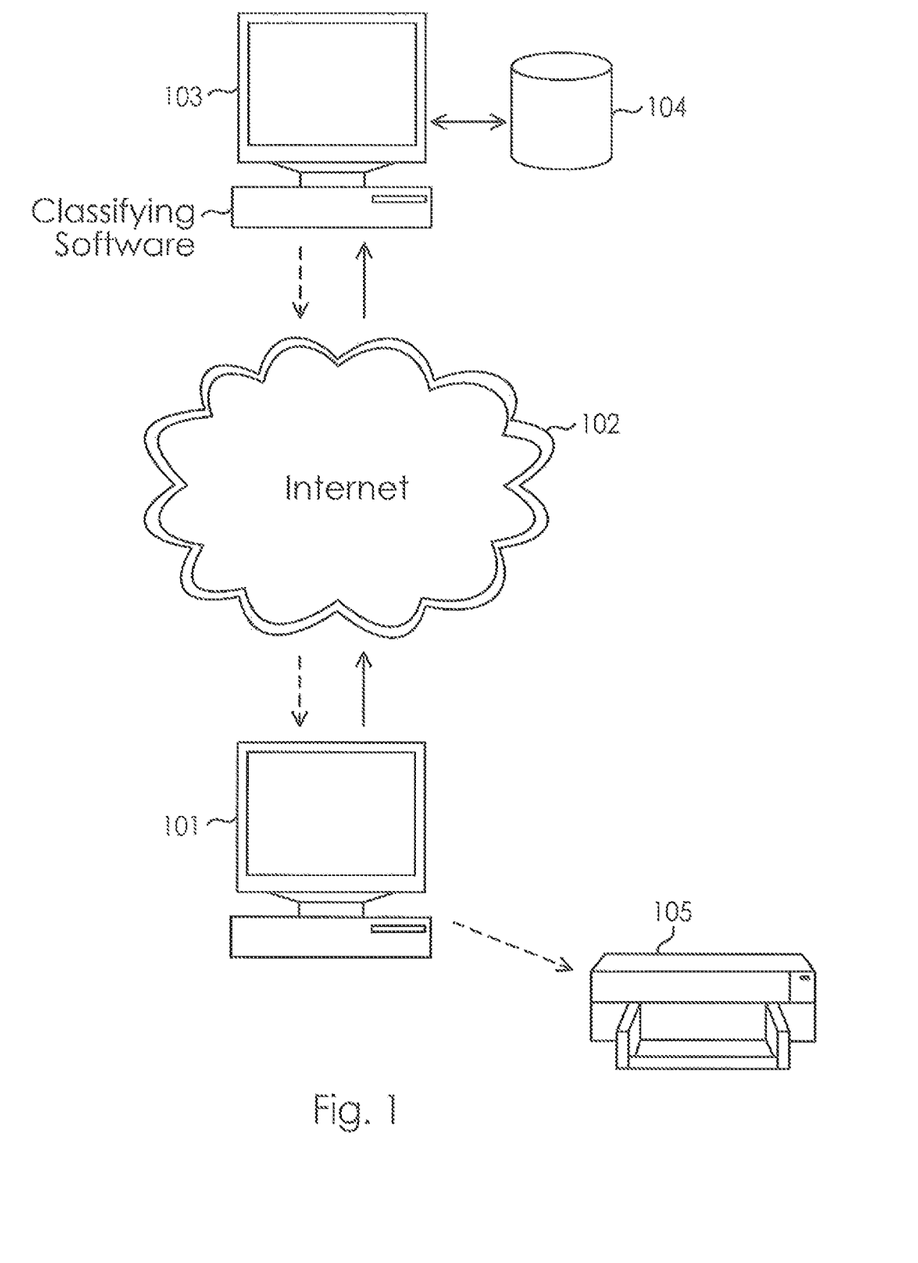
FIG. 1 provides a block diagram of an embodiment of a system for classifying exports.

In the embodiment of FIG. 1, the systems comprises a personal computer (101) which is generally under the control of the exporter. The personal computer (101) will include hardware and/or software allowing access to the Internet (102) or other network by any mechanism currently known or later discovered including, but not limited to, through a modem and phone line, a Digital Subscriber Line (DSL) connection, a cable modem, a T1 or T10 high speed connection, a wireless connection, or any connection. Generally, Internet (102) service will be provided by an Internet Service Provider (ISP). This communication software and hardware may be provided standard with the personal computer (101), may have been added for other reasons, or may be provided as apart of an embodiment of the system for receiving information and providing the classification report. This access to the Internet (102) or other network allows the personal computer (101) to access the software installed on the auxiliary computer (103). As discussed more fully below, the auxiliary computer (103) may be arranged in the form of cloud computing model such that the network allows access to the "cloud." In an alternative embodiment, the software may instead be installed on the personal computer (101) rather than the auxiliary computer (103). In this embodiment of the system, the auxiliary computer (103) and the Internet (102) would not be necessary.

Throughout this disclosure, the term "computer" will be used to describe hardware which implements functionality of various systems. The term "computer" is not intended to be limited to any type of computing device but is intended to be inclusive of all computational devices including, but not limited to, processing devices or processors, personal computers, work stations, servers, clients, portable computers, hand held computers, tablet computers, smartphones, and personal digital assistants (PDAs). Further, it is known to those of ordinary skill in the art that the functionality of any single computer may be spread across a number of individual machines. Therefore, a computer, as used herein, can refer both to a single standalone machine, or to a number of integrated (e.g. networked) machines which work together to perform the actions. In this way the functionality of a personal computer may be at a single computer, or may be a network whereby the functions are distributed. Further, the term "software" refers to code objects, logic, or command structures, written in any language and executable in any environment designed to be executed by or on a computer. It should be recognized that software functionality can be hardwired onto a chip or into other hardware while still considering it software within the meaning of this disclosure.

The system also comprises an auxiliary computer (103) located physically remote from the personal computer (101) and not under the control of the exporter. Preferably, the auxiliary computer (103) will be in a physically secured location. The auxiliary computer (103) also includes hardware and/or software allowing access to the Internet (102) or other network by any mechanism currently known or later discovered including, but not limited to, through a modem and phone line, a Digital Subscriber Line (DSL) connection, a cable modem, a T1 or T10 high speed connection, a wireless connection, or any connection. The auxiliary computer is generally a server type of computer capable of receiving and transmitting information via a network. In particular, the auxiliary computer (103) includes software designed to receive export information from the personal computer (101) sent via the Internet (102) and to respond to that export information with either a request for additional export information or a classification report, both of which are understood by the personal computer (101) through a combination of the software and the Internet (102). This software is called "classifying software." As noted above, in an alternative embodiment, the classifying software may be installed on the personal computer (101) rather than the auxiliary computer (103). In this embodiment of the system, the auxiliary computer (103) and the Internet (102) would not be necessary.

Generally, a single auxiliary computer (103) will be presumed to communicate with a plurality of personal computers (101) via the Internet (102) or other network. However, in an alternative embodiment, there may be more than one auxiliary computer configured to communicate with the plurality of personal computers (101). Therefore, the auxiliary computers (103) and personal computers (101) may be arranged in any form of server/client relationship, as that term is understood by those of ordinary skill in the art, with the auxiliary computers (103) generally acting as servers and the personal computers (101) generally acting as clients. In this regard, the auxiliary computer(s) (103) could also act as a cloud computing model, as that term is readily understood by one of ordinary skill, allowing for a single point of network access for the personal computers (101) to a shared pool of configurable computing resources (e.g., networks, servers, storage, applications, and services) that can be rapidly provisioned and released with minimal management effort or service provider interaction.

The auxiliary computer (103) also may be a standalone machine, or may have access to external resources such as an external memory or database (107). In an embodiment, multiple auxiliary computers have access to a shared memory such as a database (104). This database, however, is by no means necessary.

The personal computer (101) can transmit export information to the classifying software on the auxiliary computer (103) via the Internet. The export information will generally comprise a transmission sent via a standard Internet protocol such as hypertext transfer protocol (http) or any other protocol used on the Internet whether now known or later discovered. The solid line of FIG. 1 generally shows the path of the export information in this embodiment. Upon receipt of the export information at the auxiliary computer (103), the classifying software will process the export information. Based upon the export information received, the classifying software will either request additional export information, represented by the dashed line in FIG. 1, or generate a classification report.

Additionally, although not necessary by any means, there may be a printer (105) in communication with the personal computer (101) and under the control of the exporter. The printer (105) may be of any type capable of rendering paper versions of electronic data. The printer (105) will generally be connected to the personal computer (101) by a cable such as, but not limited to, a serial, parallel, or similar cable or through a wireless interface. Alternatively, the personal computer (101) may be connected to the personal computer via a Local Area Network (LAN) if the personal computer (101) is shared by multiple personal computers (101) co-located with each other. The classification report generated by the classifying software may then be sent from the personal computer (101) to the printer (105). This transmission will comprise a standard print task between a computer and a printer. The classification report will be formatted by the personal computer (101) for printing in accordance with standard print formatting principles.

Figure 3:
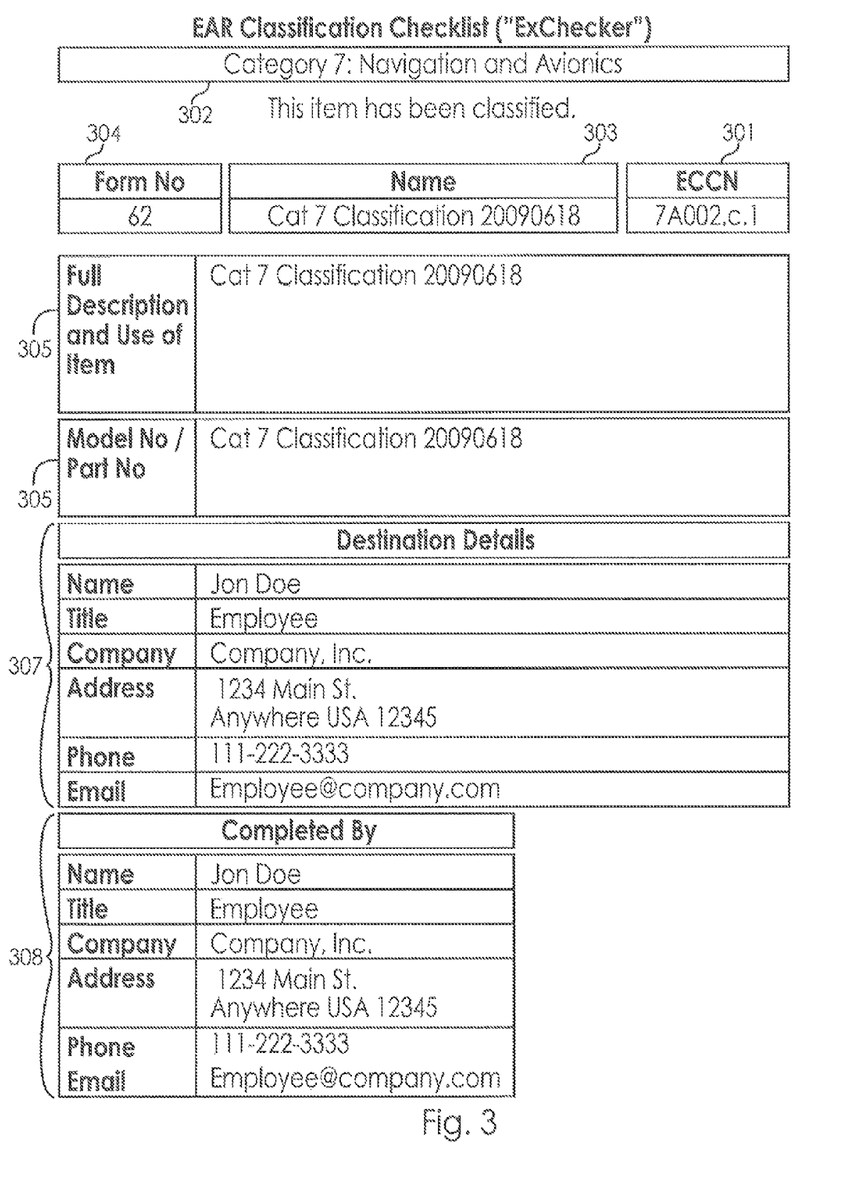
FIG. 3 provides an embodiment of a printed classification report generated according to the system.
Figure 4:
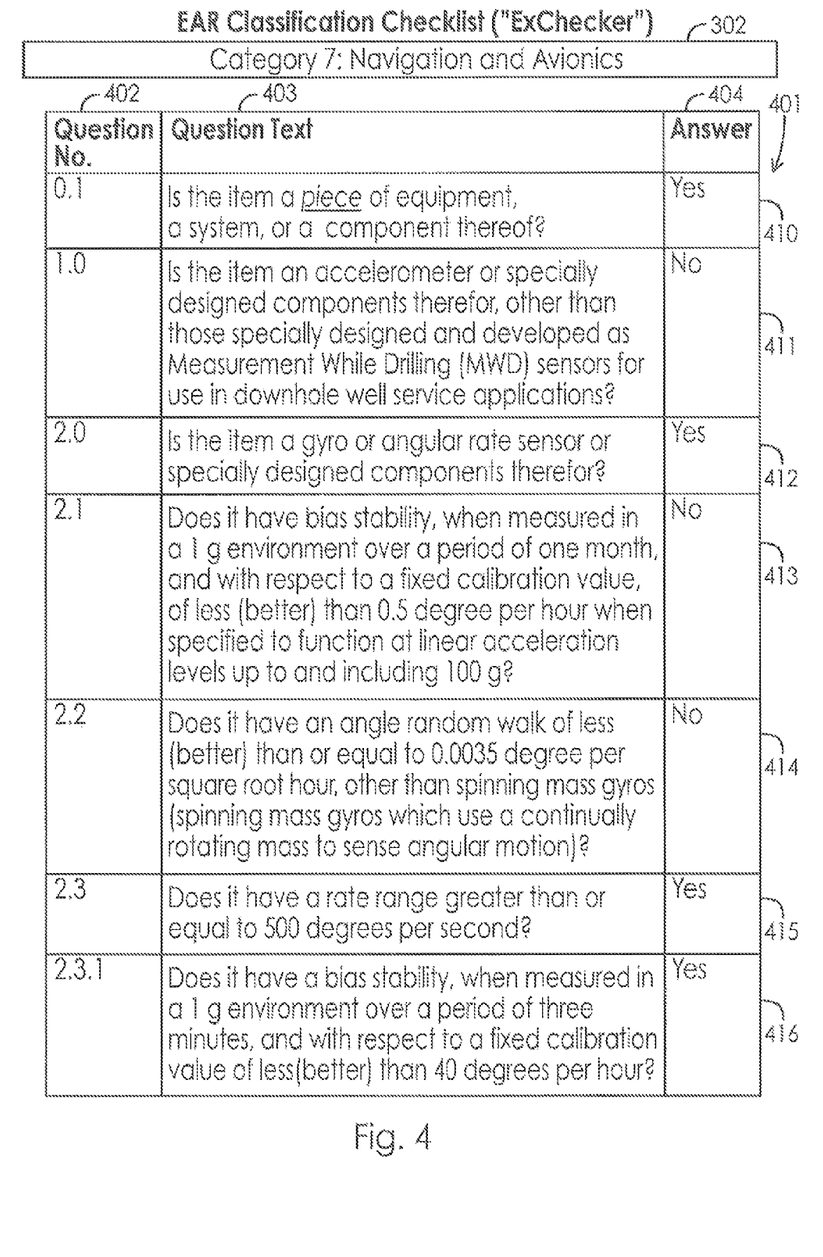
FIG. 4 provides an embodiment of an additional page of a printed classification report generated according to the system.

The exact form and content of the classification report is generally open and may include any information in any form. The report will generally be intended for use by the exporter, and may be intended to assist the exporter with the exportation process and regulations and may serve as a document evidencing the classification process having been carried out. This documentary evidence could be very beneficial for later audit investigations, governmental investigations, internal investigation, or any other applicable investigation regarding export regulations, as it would leave a paper trial of the steps taken by the exporter to ensure compliance with the applicable regulations. The embodiment of FIGS. 3 and 4 provide an example of a classification report, the contents of which will be discussed more fully below after discussing the operation that leads to such a classification. These figures are intended to be merely exemplary, and they are in no way limiting to the particular content depicted in regards to the classification report.

Figure 2:
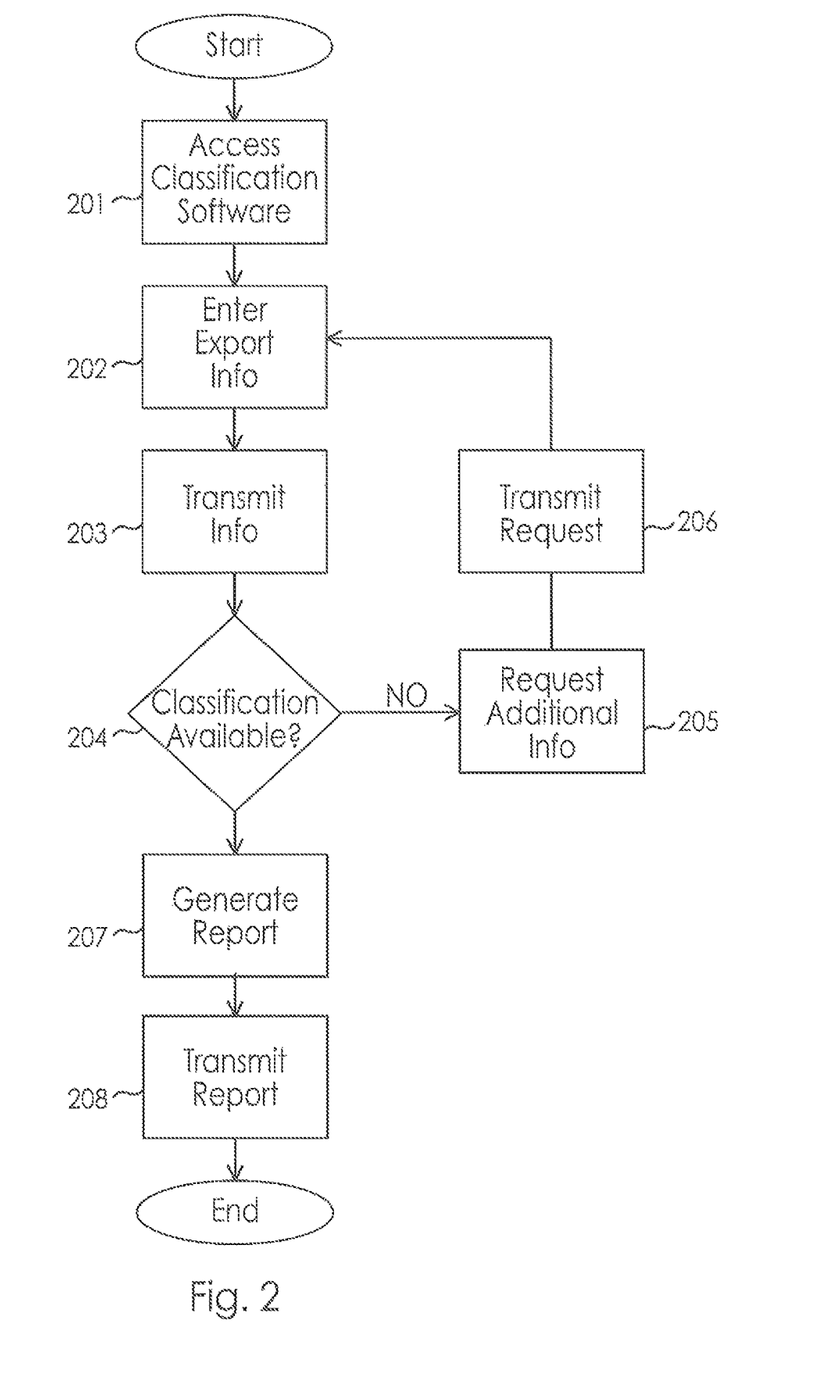
FIG. 2 provides a flowchart of steps in an operation of the embodiment of FIG. 1.

An embodiment of the operation of the system shown in FIG. 1 follows the flowchart of the steps shown in FIG. 2. In FIGS. 5-9, the processes of FIG. 2 and other processes are shown via various screen shots showing how data may be input or manipulated by an exporter interacting with the classifying software. FIGS. 1-2 and 5-9 will all be discussed in conjunction with each other due to overlay in their visualization. This order of steps is intended to be exemplary, and it is in no way limiting to the particular order of steps provided and/or allowable.

Figure 5A:
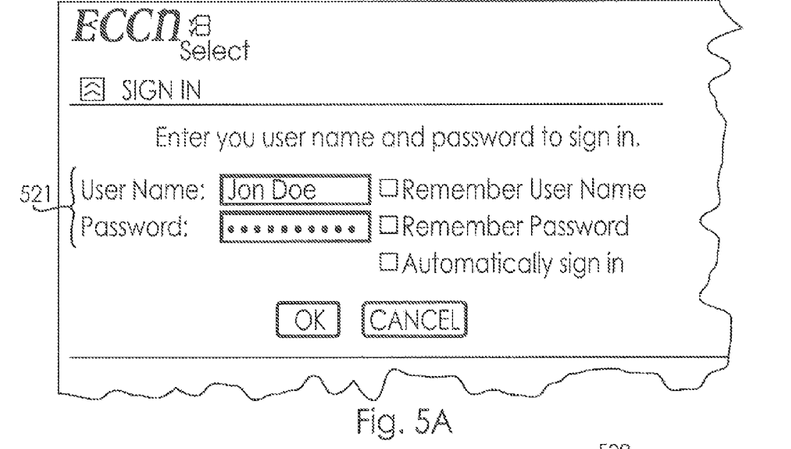
FIG. 5A provides for an embodiment of a screenshot showing a sign in screen for use by an exporter to enter log-in information.
Figure 5B:
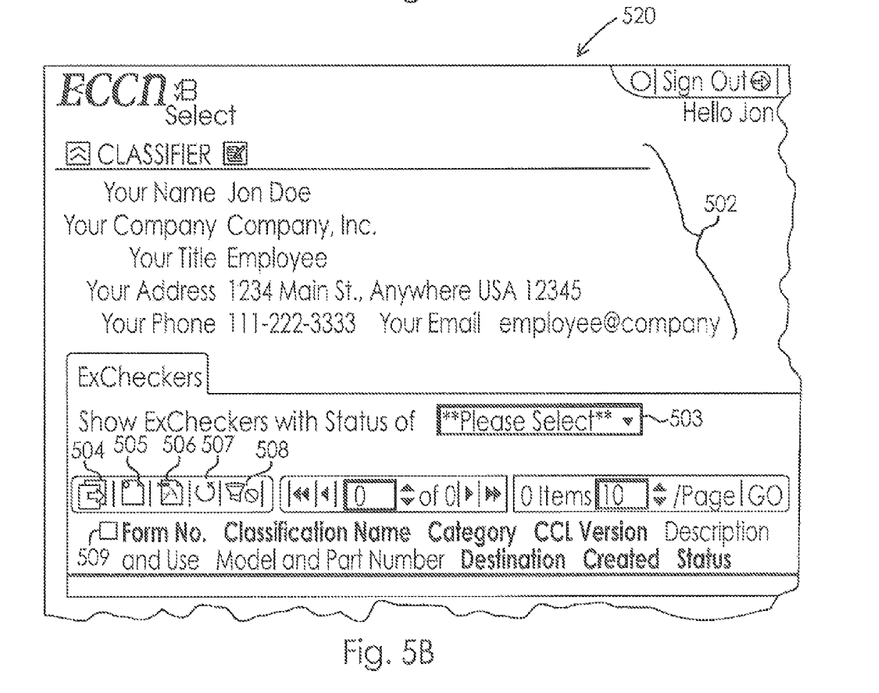
FIG. 5B provides an embodiment of a screenshot showing a home page for use by an exporter to access previous classifications or start a new classification.

An exporter will generally access the Internet from his/her personal computer (101), allowing access to the classifying software via the network. The exporter will then "sign in" to the software with log-in information (521), as shown in the sign in screen in FIG. 5A (or create a log-in if such has not already been completed), which will then display the home page (520) containing, amongst others, the exporter details (502) (including, but not limited to, name, company, title, address, phone number, and email address), as shown in FIG. 5B. In an embodiment, the exporter will then have several options depending on various icons on the home page (520). Firstly, as shown in FIG. 5B, the exporter will have four particular status options (503) to choose from regarding previous classification report attempts: (1) Pending—the exporter has entered general, header information, but has not answered any of the questions regarding the export; (2) In Progress—the exporter has answered at least one questions about the export, but has not yet received a classification report; (3) Classified—the exporter has finished all the questions and received a classification report; or (4) Not Classified—the particular export could not be classified, for example, if the export is under the jurisdiction of the DDTC under the ITAR.

Once a status option (503) is selected, all forms associated with that status option (503) will be displayed, and for each form, the exporter will have additional options, including, but not limited to: expand the form to show the notes section (which allows the exporter to add notes about the form and/or classification); resume the classification process for this form; edit the header information for this form; and select this form. Additionally, if Classified is selected, the exporter will generally be able to access any previous classification reports, such as that shown in FIGS. 3-4.

Additionally, for any of the status options (503) selected, the exporter will have several other icons available for various other operations. For example, the exporter could select release (504), which releases any selected classification report for review. This release could be sent (via any form of transmission, including, but not limited to, email, Internet messaging, text, or the like) to a party associated with the exporter or a party associated with the system. In this regard, the release could be sent via email to a reviewer listed by the exporter to notify the reviewer that the report is ready to be reviewed. The exporter could also select new (505), which then allows the exporter to generate a new classification process, as discussed more fully below. The exporter could select list (506), which then creates a list of all forms for the selected status option (503) (i.e., Pending, In Progress, Classified, Not Classified), for example, a PDF list. The exporter could select refresh (507), which refreshes the list of all forms for the selected status option (503). The exporter could also select clear (508), which clears the selected status option (503). Finally, the exporter could select all (509), which selects all forms for the particular status option (503).

Returning to FIG. 2, in regards to creating a new classification report, of which the current system is principally concerned, the exporter then enters the export information in step (202) for an item that is to be exported. Once the export information is entered, the personal computer (101) will transmit the export information via the Internet in step (203) to the auxiliary computer (103). This transmission between the personal computer (101) and the auxiliary computer (103) occurs almost instantaneously such that the personal computer (101) has access to the classifying software in virtually the same manner as if the software were installed on the personal computer (101). However, because the classifying software does not need to be installed on the personal computer (101), the classifying software can be accessed from any computer, including, but not limited to, portable computers, hand held computers, tablet computers, smartphones, and personal digital assistants (PDAs).

Figure 6A:
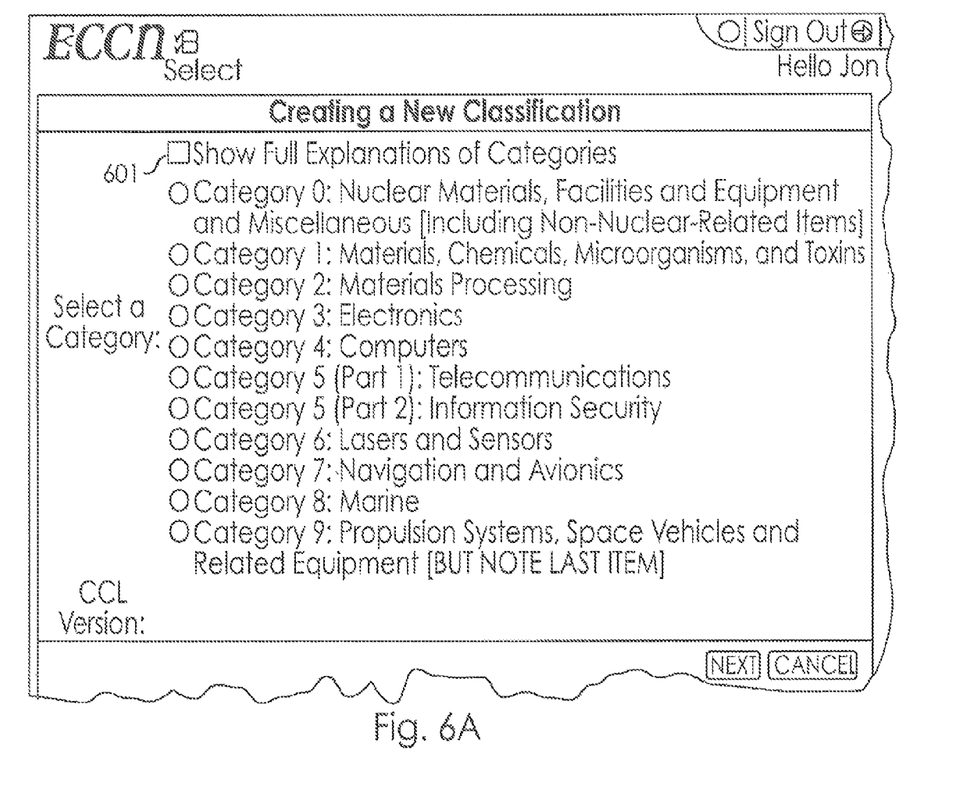
FIG. 6A provides for an embodiment of a screenshot showing a category selection screen for use by an exporter to select a category.
Figure 6B:
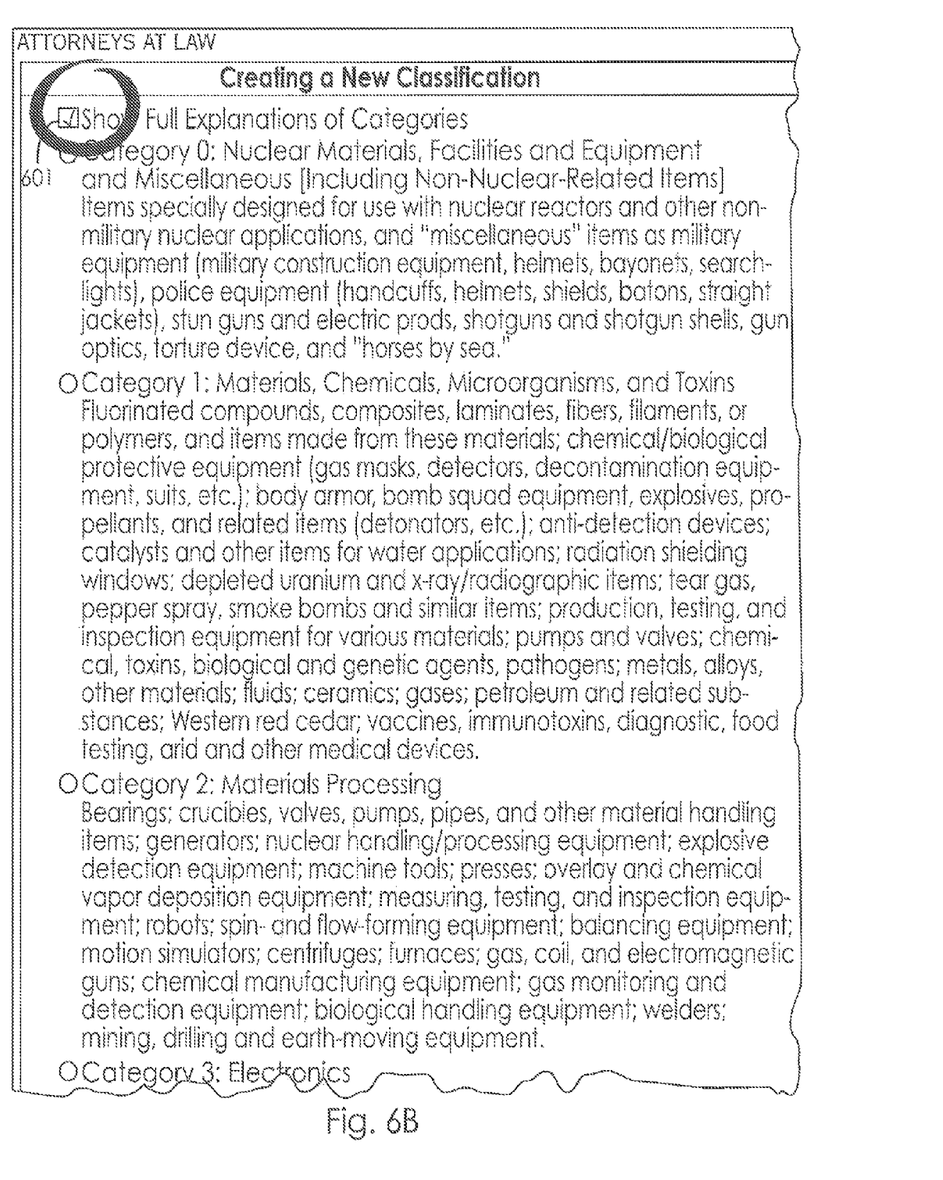
FIG. 6B provides for an embodiment of a screenshot showing a detailed category selection screen with full explanations of the categories in the embodiment in FIG. 6A.

Initially, the classifying software presents a screen to select the CCL category into which the exporter thinks the export falls, as shown in the category selection screen in FIG. 6A. This screen is a list of the ten CCL categories (eleven options), discussed more fully above, with the additional option to "Show Full Explanations of Categories" (601), which provides a detailed explanations for each of the categories, as shown in the detailed category selection screen in FIG. 6B.

In an embodiment, in step (203) in FIG. 2, the initial export information entered by the exporter will be one of the 10 CCL categories (eleven options, discussed above). For example, the exporter may select "Category 4: Computers." Additionally, the exporter will generally enter classification information (703) about the exporter, the export, and the destination details. This is the information that will be displayed in the classification report in FIG. 3 discussed more fully below. A classification is unavailable in step (204) at this time of entering the initial export information (i.e., the CCL category), and thus a request for additional export information is generated by the classifying software in step (205) on the auxiliary computer (103). The request for additional information is then transmitted back to the personal computer (101) in step (206).

Figure 7A:
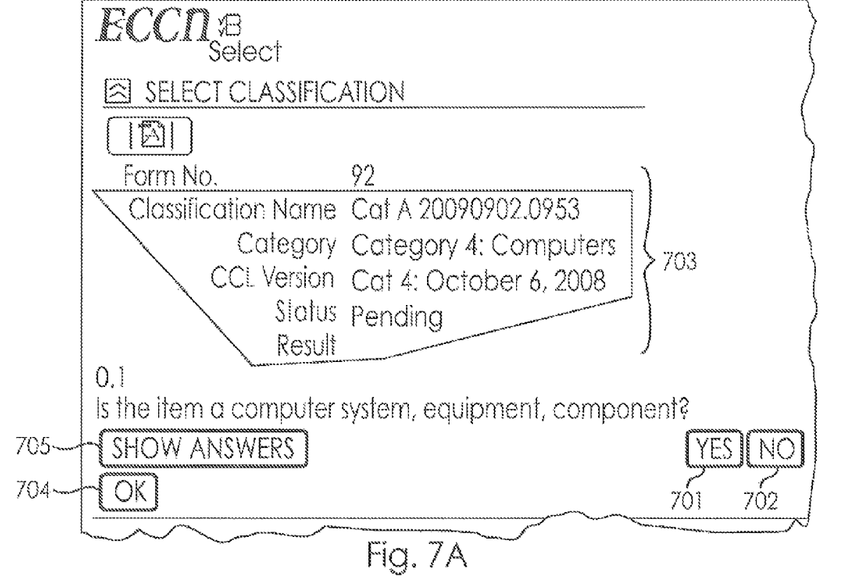
FIG. 7A provides for an embodiment of a screenshot showing a hypothetical request for information for responsive information to be entered by an exporter.
Figure 7B:
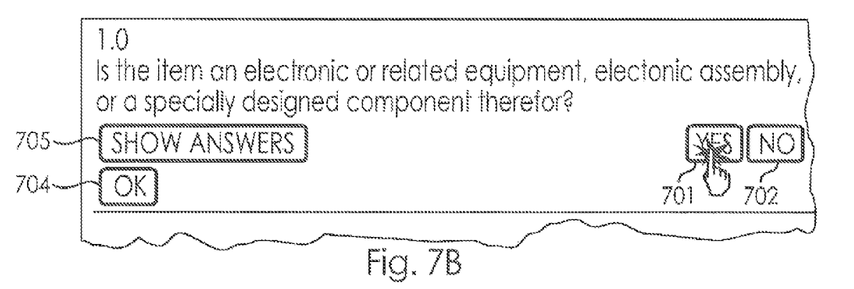
FIG. 7B provides for an embodiment of a screenshot showing a hypothetical request for information generated from the response in FIG. 7A in which "Yes" is entered as responsive information by an exporter.
Figure 7C:
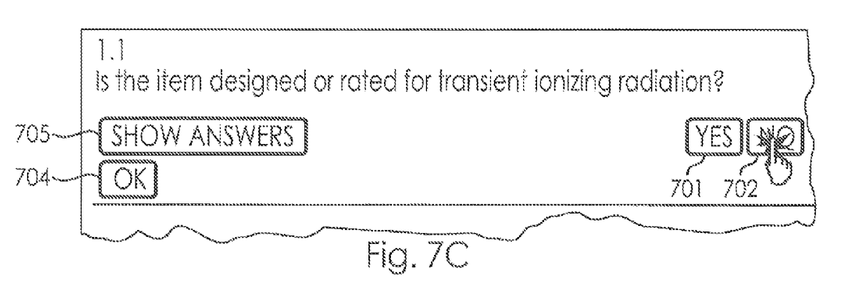
FIG. 7C provides for an embodiment of a screenshot showing a hypothetical request for information generated from the response in FIG. 7B in which "No" is entered as responsive information by an exporter.

Generally, in an embodiment, these requests for additional information are an interview process in the form of polar questions (requiring "YES" (701) or "NO" (702) responses) based upon all the export regulations discussed more fully above. Screenshots of this interview process with such requests for additional information are depicted in FIGS. 7A-7C. As shown in FIG. 7A, the classification information (703) previously entered is displayed. The responsive export information is then entered by the exporter on the personal computer (101) in step (202) by clicking "YES" (701) or "NO" (702), as suggested in FIGS. 7B and 7C, respectively. The responsive export information is transmitted to the auxiliary computer (103) in step (203) in order to generate a new request (or classification report as the case may be). Thus, for example, because "YES" (701) was selected in FIG. 7B, the particular request in FIG. 7C was generated. The process of requests for additional information, in step (205), and entering of responsive information, in step (202), continues until a classification report can be generated, in step (207).

During this requests for additional information and responsive export information, the classifying software is essentially conducting an interview process, in similar vain to the parlor game "Twenty Questions", in which the classifying software will request varying different types of additional export information, in the form of a series of polar questions, based upon the initial export information received (i.e., the CCL information) and the associated regulations. Generally, the responses to these polar questions (i.e., the responsive information) result in an ECCN classification under the original chosen CCL category. At times, however, the exporter may have selected an incorrect CCL category at the start. In this situation, the series of questions will lead the exporter to the correct CCL category, and ultimately, to the ECCN classification associated with the particular export. In yet other situations, the export may not have an associated ECCN classification, and instead the export may be subject to DDTC jurisdiction under the ITAR.

Alternatively, in FIGS. 7A-7C, the exporter could have selected "OK" (705), rather than "YES" (701) or "NO" (702). In such a situation, the exporter would return to the home page (520) depicted in the screenshot in FIG. 5B. At this time, the exporter will have available all the options/icons discussed above in regards to FIG. 5B.

Figure 8A:
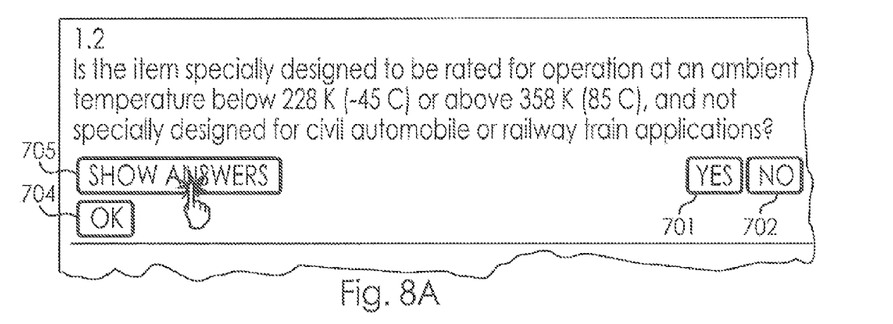
FIG. 8A provides for an embodiment of a screenshot showing an exporter choosing to show all previous answers.
Figure 8B:
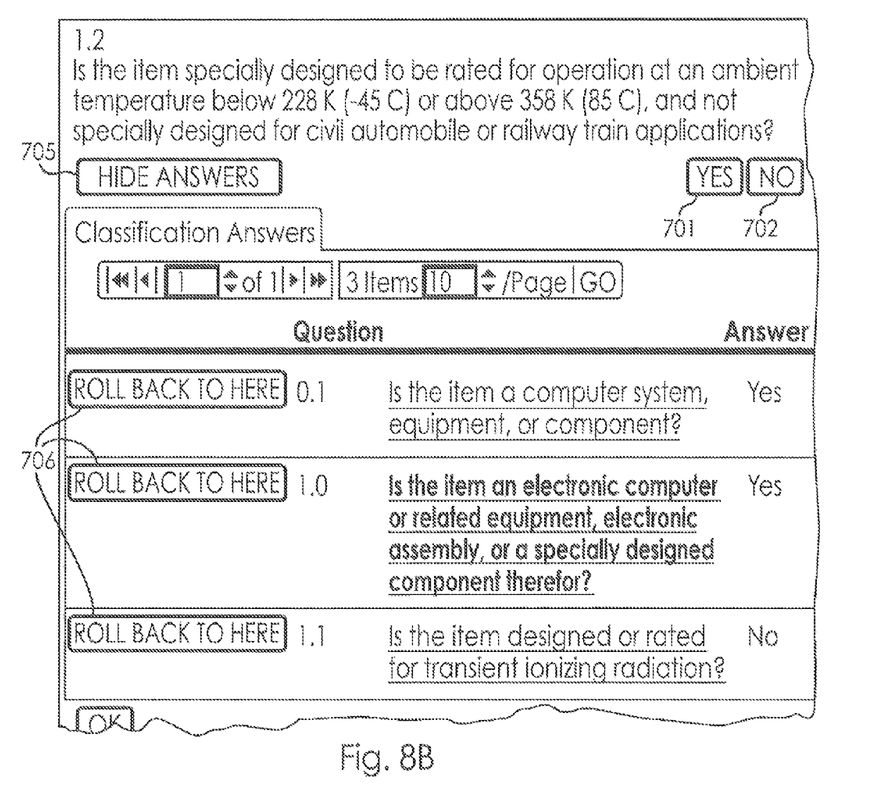
FIG. 8B provides an embodiment of a screenshot showing all the answers after the selection in FIG. 8A.

Additionally, an exporter is able to review any previous requests and responses by clicking the "SHOW ANSWERS" (705), as suggested in FIG. 8A. After the "SHOW ANSWERS" (705) has been clicked, all previous requests and response will be displayed, as shown in FIG. 8B. This option could be useful, for example, if an exporter was unsure of a previous response or determines that he/she incorrectly answered a previous request. In this regard, the exporter could then select "ROLL BACK TO HERE" (706) on the particular response, in which case the question is removed from the list of responses and the exporter is presented with that particular request selected. For example, an exporter may change his or her previous response, and as a result, the system may generate a new, different request or a classification report as a result of the new response.

In an embodiment, after a classification report has been generated, the classification software may then cause the classification report to be saved on the auxiliary computer (103). This classification report is then transmitted to the personal computer (101) in step (208). Additionally, in an embodiment, in step (208), the classification software may cause the classification report to be saved on the personal computer (101), for example including, but not limited to, saving as a PDF document, a word document, an excel document, or the like.

The form of the series of questions does not necessarily have to be polar type questions. In an alternative embodiment, for example, the questions could be of the multiple choice or true/false type. What is important is that the classification uses deductive reasoning based on both the responses to a prearranged set of questions and the associated regulations (i.e., the export information) in order to determine the appropriate classification of the export.

Figure 9:
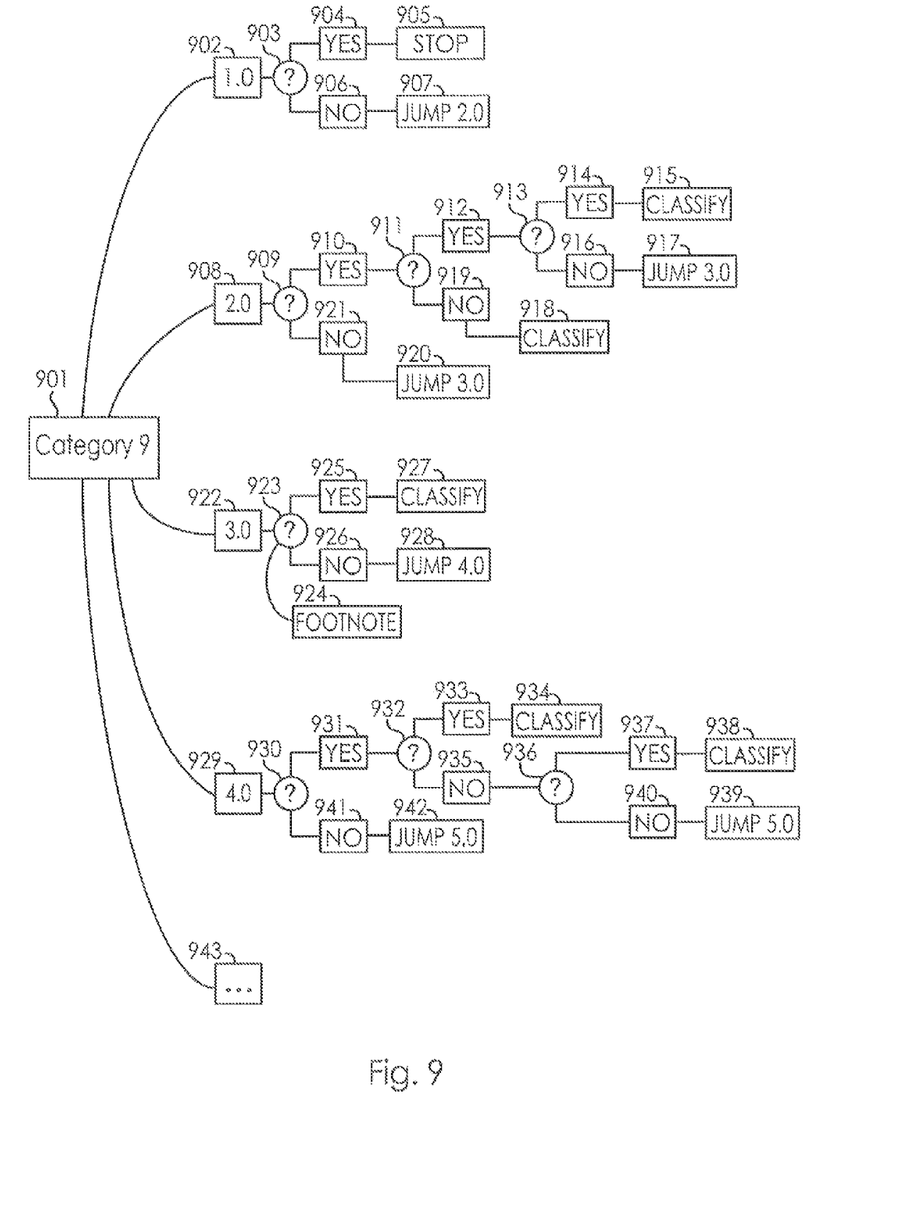
FIG. 9 provides an embodiment of an example of a plausible flowchart for a process performed according to the present system and method.

Turning now to FIG. 9, a hypothetical, exemplary scenario of this interview process (i.e., the requests for additional information and responsive export information) will be discussed in detail. Additionally, references will be made to the screenshots in FIGS. 6A-8B; however the information contained in these screenshots will not necessarily be the same information as discussed in the below scenario. In this hypothetical scenario, various iterations of possible responsive export information to the requests for additional information will be discussed. One of ordinary skill in the art, however, would recognize that this is in no way limiting, and instead, this scenario is merely described to give the reader a more full understanding of plausible examples of requests for information according to the present system.

In this embodiment, in step (901), the exporter may select "Category 9: Propulsion Systems, Space Vehicles and Related Equipment" as the CCL Category for the initial export information, such as the screen shown in FIG. 6A. The system may then generate, in step (902), screenshots similar to those in FIGS. 7A-7C with the following request in step (903), for example: "Is the item a propulsion system designed or rated against transient ionizing?" If the "YES" button is selected in step (904), a classification may then be generated in step (905) that "The item is subject to DDTC jurisdiction under the ITAR. (See 22 CFR part 121)."

Alternatively, if the "NO" button is selected in step (906) in response to the request in step (903), the system may jump to a different line of requests in step (907) to the line 2.0 in step (908) and generate the following request in step (909), for example:

Is the item an aero gas turbine engine incorporating technology that was not specifically designed, modified, or equipped for military uses or purposes or developed principally with U.S. Department of Defense funding, and that is required for the development or production of any of the following:

(1) Gas turbine blades, vanes or tip shrouds, made from directionally solidified (DS) or single crystal (SC) alloys and having (in the 001 Miller Index Direction) a stress-rupture life exceeding 400 hours at 1,273 K (1,000° C.) at a stress of 200 MPa, based on the average property values;

(2) Multiple domed combustors operating at average burner outlet temperatures exceeding 1,813 K (1,540° C.) or combustors incorporating thermally decoupled combustion liners, non-metallic liners, or non-metallic shells;

(3) Components manufactured from organic composite materials designed to operate above 588 K (315° C.), metal matrix composite, ceramic matrix, intermetallic or intermetallic reinforced materials described in ECCN Entry 1C007, or composite material described in ECCN 1C010 and manufactured with resins described in ECCN Entry 1C008;

(4) Uncooled turbine blades, vanes, tip-shrouds or other components, designed to operate at gas path total (stagnation) temperatures of 1,323 K (1,050° C.) or more at sea-level static take-off (ISA) in a 'steady state mode' of engine operation;

(5) Cooled turbine blades, vanes or tip-shrouds, other than those described in ECCN 9E003.a.1, exposed to gas path total (stagnation) temperatures of 1,643 K (1,370° C.) or more at sealevel static take-off (ISA) in a 'steady state mode' of engine operation;

(6) Airfoil-to-disk blade combinations using solid state joining;

(7) Gas turbine engine components using diffusion bonding technology described in ECCN 2E003.b;

(8) Damage tolerant gas turbine engine rotating components using powder metallurgy materials described in ECCN 1C002.b;

(9) Full authority digital electronic engine control (FADEC) for gas turbine and combined cycle engines and their related diagnostic components, sensors and specially designed components; or (10) Adjustable flow path geometry (other than that for reverse thrust) and associated control systems for gas generator turbines, fan or power turbines, propelling nozzles, or hollow fan blades (excluding inlet guide vanes, variable pitch fans, variable stators or bleed valves for compressors)?

Either "YES" or "NO" may be selected in response to this request in step (909). If the "NO" button is selected in step (921) in response to the request in step (909), the system may jump to a different line of requests in step (920) to the line 3.0 in step (922), discussed below. Alternatively, if the "YES" button is selected in step (910) in response to the request in step (909), a new request may be generated in step (911), for example:

Is it certified by the civil aviation authority of a Wassenaar Arrangement participating country (Argentina, Australia, Austria, Belgium, Bulgaria, Canada, Croatia, Czech Republic, Denmark, Estonia, Finland, France, Germany, Greece, Hungary, Ireland, Italy, Japan, Latvia, Lithuania, Luxembourg, Malta, Netherlands, New Zealand, Norway, Poland, Portugal, Romania, Russia, Slovakia, Slovenia, South Africa, South Korea, Spain, Sweden, Switzerland, Turkey, Ukraine, United Kingdom, or United States) and intended to power non-military manned aircraft for which a civil Type Certificate or equivalent document recognized by the International Civil Aviation Organization (ICAO) has been issued by one of those countries?

Either "YES" or "NO" may be selected in response to this request in step (911). If the "NO" button is selected in step (919), the export may be classified in step (918) as "9A001.a", for example. Alternatively, if the "YES" button is selected in step (912) in response to the request in step (911), a new request may be generated in step (913), for example:

Is it designed to power an aircraft designed to cruise at Mach 1 or higher for more than 30 minutes?

Either "YES" or "NO" may be selected in response to this request in step (913). If the "YES" button is selected in step (914), the export may be classified in step (915) as "9A001.b", for example. Alternatively, if the "NO" button is selected in step (916), the system may jump to a different line of requests in step (917) to the line 3.0 in step (922), discussed below.

As noted above, the "NO" responses in steps (921) and (916) caused the system to jump to a different line of requests in steps (920) and (917) to the line 3.0 in step (922) and generate the following request in step (923), for example:

Is the item a marine gas turbine engine with an ISO standard continuous power rating of 24,245 kW or more and a specific fuel consumption not exceeding 0.219 kg/kWh in the power range from 35 to 100%, or a specially designed assembly or component therefor?

Additionally, the system may note in step (924) that:

"Marine gas turbine engine" includes those industrial, or aero-derivative, gas turbine engines adapted for a ship's electric power generation or propulsion.

Either "YES" or "NO" may be selected in response to this request in step (923). If the "YES" button is selected in step (925), the export may be classified in step (927) as "9A002", for example. Alternatively, if the "NO" button is selected in step (928) in response to the request in step (923), the system may jump to a different line of requests in step (928) to the line 4.0 in step (929) and generate the following request in step (930), for example:

Is the item a specially designed assembly or component incorporating any of the technologies described in ECCN 9E003.a for the development or production of gas turbine engine propulsion systems?

Either "YES" or "NO" may be selected in response to this request in step (930). If the "NO" button is selected in step (941) in response to the request in step (930), the system may jump to a different line of requests in step (942) to the line 5.0, not depicted in FIG. 9 but suggested in step (943). Step (943) depicts that the above and below interview process could continue indefinitely. Additionally, these responses to the requests may eventually either lead to a notification that the exporter has selected the wrong initial category in step (901) and take the exporter to the correct initial category.

Alternatively, if the "YES" button is selected in step (931) in response to the request in step (930), a new request may be generated in step (932), for example:

Is the gas turbine engine propulsion system for which the assembly or component is specially designed classified in ECCN Entry 9A001?

Either "YES" or "NO" may be selected in response to this request in step (932). If the "YES" button is selected in step (933), the export may be classified in step (934) as "9A003.a", for example. Alternatively, if the "NO" button is selected in step (935) in response to the request in step (932), a new request may be generated in step (936), for example:

Is the design or production origins of the gas turbine engine propulsion system for which the assembly or component is specially designed either unknown or a Country Group D:1 country (Albania, Armenia, Azerbaijan, Belarus, Burma, Cambodia, China, Georgia, Iraq, Kazakhstan, N. Korea, Kyrgyzstan, Laos, Libya, Macau, Moldova, Mongolia, Russia, Tajikistan, Turkmenistan, Ukraine, Uzbekistan, or Vietnam)?

Either "YES" or "NO" may be selected in response to this request in step (936). If the "YES" button is selected in step (937), the export may be classified in step (938) as "9A003.b", for example. If the "NO" button is selected in step (940) in response to the request in step (936), the system may jump to a different line of requests in step (939) to the line 5.0, not depicted in FIG. 9 but suggested in step (943).

The classification report is generally the end product of the above interview process. An embodiment of such a classification report is depicted in FIGS. 3-4. In an embodiment, the classification report will generally contain a classification (301) (generally either ECCN or USML) and may also contain the applicable regulation and export controls associated with the classification and regulation. This information is helpful, and essential, when exporting goods of any kind to ensure compliance. Additionally, in an embodiment, the classification may include, but is not limited to: category (302); name of the report (303); form number (304); any regulations associated with the export; description and/or use of the export (305); the model and/or part number of the export (306); the destination details (307) (including, for example, name, title, company, address, phone number, and email); the exporter details (313) (including, for example, name, title, company, address, phone number, and email); and a detailed analysis (401) of how the classification (301) was determined (e.g., including the CCL category selected and all requests for export information and the associated responses) as shown in FIG. 4.

As noted above, FIG. 4 contains a detailed analysis (401) of how the classification (301) was determined. This analysis will generally include the question number (402), question text (403), and answer (404) that were provided during the operation of the system and classifying software discussed above.

A brief discussion of the question texts (403) and answers (404) in FIG. 4 that generated the classification (301) in FIG. 3 follows. This report is based off another hypothetical scenario in which the exporter supplied responsive information to the requests for additional information, similar to that described above in FIG. 10.

In FIG. 4, the exporter initially selected "Category 7: Navigation and Avionics" for the category (302). In line (410), the classifying software then generated Question No. 0.1—"Is the item a piece of equipment, a system, or a component thereof?"—to which the exporter answered "Yes". As a result, in line (411), the classifying software then generated Question 1.0—"Is the item an accelerometer or specially designed components therefore, other than those specially designed and developed as Measurement While Drilling (MWD) sensors for us in downhole well service applications?"—to which the exporter answered "No". As a result, in line (412), the classifying software then generated Question 2.0—"Is the item a gyro or angular rate sensor or specially designed components therefore?"—to which the exporter answered "Yes". As a result, in line (413), the classifying software then generated Question 2.1—"Does it have a bias stability, when measured in a 1 g environment over a period of one month, and with respect to a fixed calibration value, of less (better) than 0.5 degree per hour when specified to function at linear acceleration levels up to and including 100 g?"—to which the exporter answered "No". As a result, in line (414), the classifying software generated Question 2.2—"Does it have an angle random walk of less (better) than or equal to 0.0035 degree per square root hour, other than spinning mass gyros (spinning mass gyros which use a continually rotating mass to sense angular motion)?"—to which the exporter answered "No". As a result, in line (415), the classifying software generated Question No. 2.3—"Does it have a rate range greater than or equal to 500 degrees per second?"—to which the exporter answered "Yes". As a result, in line (416), the classifying software generated Question No. 2.3.1—"Does it have a bias stability, when measured in a 1 g environment over a period of three minutes, and with respect to a fixed calibration value of less (better) than 40 degrees per hour?"—to which the exporter answered "Yes". As a result, the export was given as a classification (301) of "7A002.c.1," as shown in FIG. 3.

The benefits of this system are numerous. Firstly, the system allows an exporter to generate a classification report anywhere that internet is available. For example, the exporter can access the classification software, via the Internet, from his/her computer at the workplace. Alternatively, the exporter may need to hastily determine the associated classification, for example, when making a last minute determination when the export is about to be shipped to a foreign destination. In such a situation, the exporter can advantageously access the classification software (and determine the classification) via his/her handheld device (e.g., smartphone). Additionally, this system documents not only the applicable classification, but may also contain a report detailing the classification process. Such a report could be useful, for example, should a government agency ever investigate an exporter to determine compliance with the applicable regulations. Finally, the classification software saves an exporter from the time needed to navigate the voluminous and countless export regulatory rules and requirements or the cost associated with seeking the advice of an expert. In this regard, the system discussed herein protects against misclassification and mischaracterization of exports and the dangers inherent with such a misclassification.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A system for classifying a good for export, the system comprising:
    a first computer, said first computer including classification software running thereon;
    a second computer, said second computer located at a location remote from said first computer and connected to said first computer by a network, said second computer obtaining export information and accessing said classification software via said network,
    wherein said classification software on said first computer
        (a) generates a request for export information;
        (b) sends said request for export information to said second computer;
        (c) receives a response to said request for export information from said second computer;
        (d) generates at least one additional request for export information based upon the latest received response from said second computer;
        (e) sends said at least one additional request for export information to said second computer; and
        (f) repeats steps (d) and (e) until said classification software has sufficient information to classify a good for export; and
    wherein said classification software generates a classification report showing a classification for said good for export and each response by said second computer to all said requests for export information.

2. The system of claim 1 wherein said classification comprises an Export Control Classification Number (ECCN) classification.

3. The system of claim 1 wherein said request for export information of step (a) comprises requesting a Commerce Control List (CCL) category.

4. The system of claim 1 wherein all said requests for export information are based on export regulations.

5. The system of claim 4 wherein all said requests for export information comprise prearranged questions.

6. The system of claim 5 wherein at least some of said prearranged questions comprise polar questions.

7. The system of claim 1 wherein said network comprises the Internet.

8. The system of claim 1 wherein said first computer is a server.

9. The system of claim 1 wherein said classification software causes said classification report to be saved on said second computer.

10. The system of claim 1 wherein said classification software causes said classification report to be saved on said first computer.

11. A method for classifying a good for export, the method comprising:
    providing a first computer, said first computer including classification software running thereon;
    providing a second computer, said second computer located at a location remote from said first computer and connected to said first computer by a network, said second computer obtaining export information and accessing said classification software via said network;
    said first computer:
        (a) generating a request for initial export information, said request for initial export information comprised of Commerce Control List (CCL) categories;
        (b) sending said request for initial export information to said second computer;
        (c) receiving a response to said request from said second computer;

(d) generating at least one request for additional export information based upon the latest received response from said second computer, each of said at least one request for additional export information being comprised of a single polar question;
(e) sending said at least one request for additional export information to said second computer; and
(f) repeating steps (d) and (e) until said classification software has sufficient information for said classification software to classify a good for export; and said first computer generating a classification report based on said responses to said request for initial export information and said request for additional export information.

\* \* \* \* \*